Patented Aug. 22, 1944

2,356,357

UNITED STATES PATENT OFFICE 2,356,357

TREATMENT OF HYDROCARBON FRACTIONS

Carleton H. Schlesman, Camden, and John H. McCracken, Woodbury, N. J., assignors to Socony-Vacuum Oil Company, Incorporated, a corporation of New York No Drawing. Application April 24, 1943, Serial No. 484,482

3 Claims. (Cl. 196—39)

This invention relates to treatment of hydrocarbon fractions which are of mineral oil origin and is particularly concerned with cracked distillates such as motor fuel, aviation gasoline and the like.

Motor fuels and similar products have many properties and deficiencies in common which may be regarded as typified in aviation base stocks, for which purpose the specifications of the distillate are normally quite strict. It is required that the acid heat value, measured as the rise in temperature upon agitation with sulfuric acid, be low. Further, the octane number and susceptibility to octane number improvement by addition of tetra-ethyl lead are required to be extremely high. Heretofore, the refining of gasoline to meet these rigid specifications has been a very expensive process. The most general practice has been to treat the raw gasoline with relatively large quantities of sulfuric acid to remove the components which adversely affect the properties thereof. An acid sludge is then removed from the treated gasoline which must then be further treated to remove acid bodies soluble in the oil. Extensive caustic washing is required and difficulties due to emulsification are generally encountered. The expensive reagents used for the acid treatment and caustic washing are lost in the process unless expensive operations are conducted to regenerate sulfuric acid from the acid sludge.

We have now found that raw gasoline may be processed to prepare it for market by a relatively inexpensive refining process with a normally gasous catalyst in small amounts, which catalyst is largely recovered in a form suitable for re-use. The catalysts contemplated by this invention are boron trifluoride and hydrogen fluoride. Elevated temperatures are required for adequate treatment of the gasoline with these catalysts, the refining being conducted at a temperature of at least about 125° F. Higher temperatures give more rapid and more satisfactory treatment and we prefer to conduct our novel refining at a temperature within the approximate range of 300° to 500° F.

Pressure does not appear to be essential but superatmospheric pressures are a definite advantage in commercial operation. In general, we find that pressures upwards of 100 pounds per square inch are desirable and prefer pressures of about 1000 to 1500 pounds per square inch.

This treatment results in drastic reduction of acid heat, probably by a combination of olefin polymerization and alkylation of aromatics by olefins. A substantial increase in aromatic content is noted. The octane number is increased at the same time and the gasoline is improved generally with respect to quality for use in an internal combustion engine.

It is often found advantageous to add isoparaffins to the raw distillate being treated in order that reaction with olefins in the distillate may take place to produce high anti-knock hydrocarbons. If desired, the raw distillate may be fractionated and the fractions subjected to different treatment. Thus, a light fraction from catalytic cracking of gas oil is advantageously fractionated into heavy and light portions. The light portion is treated with isobutane and a small amount of hydrogen fluoride or boron trifluoride after which the two portions are blended to give a high octane gasoline. The heavy portion may be treated with a gaseous catalyst according to this invention if desired, before blending with the treated light portion.

Example I

A raw gasoline of 316° F. end point having an initial acid heat value of 158° F. was treated with anhydrous boron fluoride in a bomb by adding 40.5 grams of the catalyst to 1337 grams of gasoline. The bomb was heated and rocked at 500° F. under a pressure of 1200 pounds per square inch. From the treated gasoline, 1.4% of insoluble matter was separated and the treated gasoline was then redistilled and blended with the product of Example II for testing.

Example II

The gasoline of Example I was treated with 82 grams boron trifluoride to 1336 grams of gasoline in the bomb at 475° F. under 100 pounds per square inch pressure. After removal of 1.6% of insoluble matter, and redistillation, the treated material was blended with the product of Example I and the blend was washed with water to remove residual boron trifluoride. The blended fraction had an acid heat of 2° F. as compared with 158° F. for the raw material treated. The octane number of the blend with 1 cc. of tetra-ethyl lead per gallon was 83.3 as compared with 80.9 for the raw gasoline plus 1 cc. of lead.

Example III

Into a Monel autoclave were charged 150 grams of catalytic gasoline and 100 grams of anhydrous hydrogen fluoride. The contents were heated to 130° F. for 45 minutes. The gage pressure at this temperature was 45 to 50 lbs./sq.

in. The gasoline was withdrawn and stored for 16 hours over sodium fluoride and then refluxed with dilute caustic to remove any organic fluorides. A sample of the gasoline was then distilled. All material boiling below 370° F., the approximate end-point of the untreated gasoline, was collected as the distillate. The yield of redistilled gasoline was 66% by volume of the amount charged to the still. This loss corresponds very nearly to the sum of the olefin content and the amount of aromatics removed by alkylation to higher-boiling compounds.

| Properties | Untreated gasoline | Treated with HF |
|---|---|---|
| Gravity °A. P. I. | 63.1 | 53.7 |
| Norwood bromine number | 50.3 | 3.2 |
| Acid heat °F | 106 | 10 |
| Olefins per cent by weight | 27.7 | 1.8 |
| Aromatics do | 18.3 | 29.2 |

We claim:

1. A process for treating gasoline containing olefins and aromatics to improve the anti-knock value and decrease the olefin content thereof which comprises contacting said gasoline with a catalyst selected from the group consisting of hydrogen fluoride and boron trifluoride at a temperature of about 300° to about 500° F., removing the catalyst from contact with said gasoline and distilling the treated gasoline to obtain a product of substantially the same boiling range as the original gasoline but having a reduced olefin content, increased aromatic content and substantially improved anti-knock rating.

2. A process for treating gasoline containing olefins and aromatics to improve the anti-knock value and decrease the olefin content thereof which comprises contacting said gasoline with a catalyst selected from the group consisting of hydrogen fluoride and boron trifluoride at a pressure of at least about 1000 pounds per square inch and a temperature of about 300° to about 500° F., removing the catalyst from contact with said gasoline and distilling the treated gasoline to obtain a product of substantially the same boiling range as the original gasoline but having a reduced olefin content, increased aromatic content and substantially improved anti-knock rating.

3. A process for treating gasoline containing olefins and aromatics to improve the anti-knock value and decrease the olefin content thereof which comprises contacting said gasoline with boron trifluoride at a temperature of about 300° to about 500° F., removing the catalyst from contact with said gasoline and distilling the treated gasoline to obtain a product of substantially the same boiling range as the original gasoline but having a reduced olefin content, increased aromatic content and substantially improved anti-knock rating.

CARLETON H. SCHLESMAN.
JOHN H. McCRACKEN.